Patented July 15, 1947

2,424,068

UNITED STATES PATENT OFFICE 2,424,068

PROCESS FOR MOTHPROOFING FURS

David Traill, Ardrossan, and Andrew McLean, West Kilbride, Scotland, assignors to Imperial Chemical Industries Limited, a corporation of Great Britain No Drawing. Application February 12, 1942, Serial No. 430,694. In Great Britain March 21, 1941

6 Claims. (Cl. 8—94.14)

The present invention relates to an improved process for mothproofing furs.

The known methods of proofing furs against moths usually operate in one of two ways: they either discourage the moth from laying eggs on the furs, e. g., by means of a smell for which the moths have an antipathy; or they kill, or at least check the growth of, the larvae by rendering the fur poisonous or indigestible.

Each of these general methods has a serious drawback. A moth must lay its eggs somewhere and if it cannot find a suitable place it will lay in a place which is as like a suitable place as it can find. Consequently it may happen that in spite of a fur having been rendered repulsive to it, it may yet lay on the fur. A mothproofing method which merely acts by repelling the moth may therefore fail and any eggs laid on such a fur will become a fresh source of moths. On the other hand a method which only renders the fur poisonous to larvae cannot bring about their death until they have eaten some of the fur, i. e., caused some damage. Some known mothproofing methods, which operate by making the fur poisonous also make the fur more attractive to the moth than untreated fur.

This invention has as an object to provide a new process for mothproofing furs. A further object is to provide such a process wherewith a considerably higher degree of mothproofness can be conferred on furs than is conferred by known mothproofing processes. It is a further object of this invention to provide an economic process which will both reduce the attractiveness of furs to moths and impart properties to the furs which will kill, or prevent the growth and development of, moth larvae in the fur.

Further objects will appear hereinafter.

These objects are accomplished by the following invention.

According to the invention the fur is immersed for not less than 7 hours in an aqueous solution of formaldehyde, of saline content sufficient to prevent the skin, when in an untanned condition, from swelling during immersion, which has been acidified to a pH not above approximately 2.5. The furs are subsequently washed free from excess formaldehyde and dried.

In putting the invention into effect, the saline solution employed may conveniently be one of a freely soluble chloride, sulphate or phosphate, for instance, sodium, potassium, magnesium, aluminium, calcium or ammonium chloride; sodium, potassium, magnesium, aluminium or ammonium sulphate. The saline concentration should be not less than about 1.5 molar per litre and preferably is at least 3 molar, calculated on the sum of the amount of salt and water present. The acid used may be sulphuric, phosphoric, hydrochloric, acetic, lactic, oxalic or citric acid. High concentrations of some acids, particularly sulphuric and hydrochloric acid, damage the fur but we have found that if the saline content is as high as is specified above it is possible with these acids to acidify to a pH of 2.5 or below without the damage being more than negligible. Nitric acid has a discolouring effect on the hair of the fur and can only be used if this discolouration is not undesirable. The minimum effective concentration of acid will vary with the salt used, e. g., with saturated sodium chloride the pH can be attained at 35° C. by the addition of less than 5 per cent of hydrochloric acid calculated on the weights of acid and water present, but with three molar ammonium sulphate it is necessary to add at least 22 per cent of sulphuric acid before the pH at 35° C. is reduced to 2.5. The formaldehyde content should be preferably not less than about one half per cent, and need not exceed about 10 per cent, calculated on the sum of the amounts of water and formaldehyde present.

The time of treatment should be prolonged for several hours; in the case of rabbit fur, the mothproofing effect of a treatment lasting 7 hours at 35° C. is useful, but exeptionally useful results are obtained if the fur is treated for a period between 16 hours and 48 hours at 35° C. There is evidence that further treatment reduces the extent to which the fur is mothproofed. The treatment may be carried out at atmospheric or slightly raised temperatures.

If the fur is to be dyed we prefer not to wash it after removal from mothproofing bath, but to remove the greater part of the bath without diluting it, e. g., by centrifuging, and then to dry the fur while the remaining bath liquor is adhering to it, and, finally, to clean it with sawdust. The fur is then ready to be dyed, the excess formaldehyde being washed out in the dyebath. Such a procedure should not be followed with acids, such as sulphuric, which concentrate themselves during the drying until they are sufficiently concentrated to seriously damage the fur.

It is to be observed that the mothproofing efficiency achieved by the method of our invention is greatly superior to that obtained as a result of treatment by formaldehyde at a higher pH such as is customarily used in formaldehyde tanning. The treatment may be applied before or after the skins have been tanned, and in some cases tanning is unnecessary as the process has itself a tanning effect.

The invention is further illustrated by the following examples in which the parts are parts by weight:

Example I

To 240 parts of 26 per cent sodium chloride solution there are added 9.3 parts of 31.45 per cent hydrochloric acid solution and 7.3 parts of 40 per cent formaldehyde solution. In this solution is placed half a fresh rabbit skin in hair, and the whole is immersed in a thermostat at 35° C. for two days. At the end of this time the skin is taken out and washed thoroughly in cold water. The skin is now tacked out on a board and dried either at room temperature or by blowing warm air on to it.

If larvae of the clothes moth (*Tineola bisselliella* Hum) are now placed upon this piece of fur it will be found that they do not thrive, whereas similar larvae placed upon a similar skin that has been treated merely in 26 per cent sodium chloride solution develop normally into adults. Thus of 15 larvae placed on a piece of fur treated as above only one undersized larva survived at the end of 32 days, and the damage to the fur was estimated at 16.7 per cent. In the same time the larvae on the fur treated only with sodium chloride solution developed to 8 fully grown larvae, 5 half grown and 2 moths, whilst the damage to the fur was estimated at 87.3 per cent.

The fur may be subsequently alum tanned.

Example II

Two solutions were made up: one by adding 10 cc. of 40 per cent formaldehyde and 10 grams of $AlCl_3$ to 450 cc. of water; and the other by adding 16 cc. of concentrated HCl and 13 cc. of 40 per cent formaldehyde to 400 cc. of saturated NaCl solution. The former solution had a pH measured with the aid of a glass electrode of about 3.5 while the latter had a pH of less than 2.5. Two fleshed rabbit skins were then taken and one steeped in each of the above solutions for 48 hours at 35° C. At the end of this period they were taken from the bath, washed, the greater part of the water removed from them in a centrifuge, dried and ironed with an iron at 200° C. Four small similar squares were cut from each of the two treated rabbit skins and each placed in a Petri dish with twenty small larvae of the clothes moth. After being kept for fourteen days at 25° C. the squares were examined and the number of living and dead larvae on each counted. No moths were found. The squares were then combed to remove the hairs that had been eaten through by the larvae, and these were weighed. The squares were then shaved and the remainder of the hair weighed. The damage to each square was estimated by comparing the weight of hair combed out with the total weight of hair taken from the fur.

The squares cut from the skin which had been treated with the formaldehyde-aluminium chloride bath showed that, on the average, 38 per cent of the original larvae remained alive, 19 per cent being found dead; while on the squares treated with the formaldehyde-acid-common salt bath 6 per cent were found alive and 50 per cent dead. The cannibalistic tendency of these larvae probably accounts for the fact that the number of living and dead larvae found were fewer than the number originally placed on the fur. The average damage done to the squares treated with the formaldehyde-aluminium chloride bath was 21 per cent while those treated in the other bath showed only 12 per cent damage.

Example III

Four baths were made up containing 400 cc. saturated NaCl solution, and 13 cc. of formaldehyde solution. One of these was left unacidified but to the remaining three various amounts of hydrochloric acid were added to bring the pH in one bath to 9.5, in the second bath to 5.5 and in the third to below 2. Four fleshed rabbit skins were then steeped, one in each bath, for 48 hours and tested for mothproofness by the method described in Example 2. The damage to the fur treated at a pH of less than 2 was 16.7 per cent. In the sample treated with the bath at a pH of about 5.5 the fur damage was 69.9 per cent, while the skin treated at a 9.5 pH showed a damage of 82.7 per cent and the one treated with the unacidified bath showed damage of 87.3 per cent.

Of the larvae from the fur treated at a pH of less than 2 only 12 per cent were alive and these larvae had scarcely grown during the time they were on the skin, whereas the remaining skins showed fully developed larvae and a considerable number of moths.

Example IV

A bath was made up of formaldehyde, common salt and HCl in the proportions given in Example 2. Five rabbit skins were put into this bath which was maintained at 35° C. One of these skins was removed at the end of 7 hours; another at the end of 16 hours; another at the end of 24 hours and a fourth at the end of 31 hours and the fifth at the end of 48 hours. These were then washed, dried and ironed with an iron at about 200° C. and submitted to mothproofing tests in the manner detailed in Example 2. The fur treated for 7 hours showed a damage of 23 per cent with 10 per cent of the original number of insects left alive; that treated for 16 hours showed 10 per cent damage with 3 per cent of the original insects left alive; that treated for 24 hours showed 13 per cent damage with 4 per cent of the original insects left alive; that treated for 31 hours showed 7 per cent damage with 1 per cent of the original insects left alive; that treated for 48 hours showed 13 per cent damage with 10 per cent of the original insects left alive.

As many seemingly widely different embodiments of the invention will be apparent without departing from the spirit and scope thereof it must be understood that the invention is not limited to any specific embodiment except as defined in the appended claims.

We claim:

1. A method of mothproofing furs which comprises immersing the furs for a period of at least 16 hours in a bath comprising between 2 and 3 per cent of 40 per cent formaldehyde and between 3 and 4 per cent of 31 per cent hydrochloric acid in a saturated solution of common salt.

2. The process for mothproofing furs which comprises immersing the same for at least 7 hours in an aqueous solution having a pH not above 2.5 comprising formaldehyde in a concentration between about 0.5 and 10% and a freely soluble chloride of a metal of the first two groups of the periodic system and ammonia in concentration sufficient to prevent the skin when in an untanned condition from swelling during immersion, which concentration shall be at least 1.5 molar.

3. The process for mothproofing furs which comprises immersing the same for at least between 16 and 48 hours in an aqueous solution having a pH not above 2.5, comprising formaldehyde in a concentration of 0.5 to 10% and a freely soluble chloride of a metal of the first two groups of the periodic system and ammonia in concentration sufficient to prevent the skin when in an untanned condition from swelling during immersion and from being damaged during any subsequent evaporation of the treatment liquor, said salt concentration being in any event at least 3 molar.

4. The process of claim 2, wherein the acidity is obtained by the use of hydrochloric acid.

5. The process of claim 2, wherein the acidity is obtained by the use of sulphuric acid.

6. The process for mothproofing furs which comprises immersing the same for at least 7 hours in an aqueous solution having a pH not above 2.5, comprising formaldehyde in a concentration of 0.5 to 10% and a freely soluble chloride of a metal of the first two groups of the periodic system and ammonia in concentration sufficient to prevent the skin when in an untanned condition from swelling during immersion and from being damaged during any subsequent evaporation of the treatment liquor, said salt concentration being in any event at least 1.5 molar, thereafter removing the greater part of said treatment liquor without dilution from the treated fur, and then drying the fur while the remaining treatment liquor is adhering to the fur.

DAVID TRAILL.
ANDREW McLEAN.

REFERENCES CITED

The following references are of record in the file of this patent:

UNITED STATES PATENTS

| Number | Name | Date |
|---|---|---|
| 1,557,011 | Blockley | Oct. 13, 1925 |
| 2,240,388 | Calva | Apr. 29, 1941 |
| 2,211,645 | Calva | Aug. 13, 1940 |
| 2,225,267 | Gottfried | Dec. 17, 1940 |
| 2,348,602 | Calva | May 9, 1944 |
| 2,309,021 | Stonehill | Jan. 19, 1943 |

FOREIGN PATENTS

| Number | Country | Date |
|---|---|---|
| 5,875 | Great Britain | A. D. 1899 |
| 14,007 | Great Britain | A. D. 1900 |
| 445,033 | France | Oct. 31, 1912 |
| 116,763 | Great Britain | June 24, 1918 |
| 795,454 | France | Mar. 14, 1936 |
| 519,343 | Great Britain | Mar. 21, 1940 |
| 475,422 | Great Britain | Nov. 18, 1937 |
| 840,277 | France | Apr. 21, 1939 |
| 528,459 | Great Britain | Oct. 30, 1940 |
| 449,955 | Great Britain | July 7, 1936 |

OTHER REFERENCES

Proctor, "The Principles of Leather Manufacture," Van Nostrand, New York, 1922, 2nd ed., page 495, lines 32 to 34.

Wilson, "Chemistry of Leather Manufacture," second ed., vol. 1, pp. 121–126, Fig. 7 of page 124 being especially pertinent.